United States Patent Office 3,434,604
Patented Mar. 25, 1969

3,434,604
MATERIAL HANDLING SYSTEM
Hans Rudolph Haldimann, Zurich, Switzerland, and Helmut Bartels, Hannover, Germany, assignors to Werner Bahlsen
Filed May 12, 1966, Ser. No. 550,886
Claims priority, application Germany, May 13, 1965, B 81,916/65
Int. Cl. E04h *5/00;* B65g *67/02*
U.S. Cl. 214—16.4    10 Claims

ABSTRACT OF THE DISCLOSURE

At least two storage racks are arranged to receive loads from a first traversing platform or crane means. A second crane means is adapted to move loads from one of the racks directly to a shipping area, and a third crane means is provided for moving loads from the other rack to a conveyor means cooperating with the second crane means for delivery of the latter loads to the shipping area. The system is controlled with the aid of a model thereof.

---

The invention is concerned with a method for the stocking of goods and for the collecting of goods for different consignments, and a store for the application of this method.

It is a well-known wish to transport goods in greater stocking units from the manufacturing plant to the consumer or at least to the depository. This wish can be fulfilled only in the case of bulk goods and bulk consumers, but it cannot be fulfilled in case of a differentiated manufacturing programme with a great number of varied goods and where in the individual case consignments of even smallest quantities must be collected.

The best solutions to such cases so far known are so-called automatic stores with flow racks for the always smallest possible product units. The units to be collected for consignments are released through control signals, are transported on conveyors and directed to a collecting point from where the made up consignment is transferred into a truck. In this connection the disadvantage must be recorded, that the goods cannot be stocked in bigger units, but in the smallest units which possibly are to be collected for consignments. Moreover, the units must be stocked by hand and must be packaged into the trucks as these units in the case of bulk goods on the one hand and in the case of goods required in particularly small quantities on the other mostly differ in the size. As is known, automation of these processes is possible only if the units are of equal size. But units of equal size can be selected only in a manufacturing programme in which the maximum units of all goods are not below a certain minimum size. (Reference: Trade Journal, "Fördern und Heben," 1962, issue No. 6, pages 381–386.)

The invention gives a method for the possible "automatic" stocking and collecting of goods for consignments in the case where goods must be collected in different quantities for consignments, without it being necessary to put up with the aforelisted disadvantages. The method given by the invention is that articles of one kind are combined and stocked in individual stockable and loadable quantity units (full units) of always equal size from which the consignments are collected with regard to each type of article in full units and simple fractions of a full unit (part units), whereby the goods to be removed in the form of full units or part units are stocked at various places of the store.

Already with the stocking in process units are separated in such which are passed on unchangedly and in such of which fractions are collected for consignments.

Thus if, for example, a consignment order reads for 312 cartons of an article, a full unit of which comprises 72 cartons in 6 layers each with always 3×4=12 cartons, then this order is subdivided into a full unit order for 4 full units and a part unit order for 2 carton layers=one third of a full unit. In this connection ⅙ can be fixed as the smallest fraction so that in case of a fractional consignment always only whole carton layers must be handled if, in accordance with another invention feature, also the part quantities are stocked in the form of full units. In this case the part units of different articles, when collected for consignment are made up as stocking or shipping units, which are treated as full units. This maintains the advantage that during transport from the store to the consumer or depository one has only to deal with equal, relatively large units.

To avoid the fixing of minimum quantities ordered, according to the invention, in addition to full units and part units, small quantities when collected for consignments are made up in stocking units which are treated as full units.

It is useful that the units are transported to the store from the manufacturing plant on pallets or in containers of a standard size, that they are stocked there and collected so for consignments, in which case only the small quantities and partly the part units on collecting for consignments will change the pallet or container.

Further details of the invention result from the following explanations given on the basis of the drawings and by way of an example of a store suited for the application of the method and the corresponding auxiliary devices.

I. METHOD OF STOCKING AND COLLECTING OF ARTICLES FOR CONSIGNMENTS

Figures 1, 2:
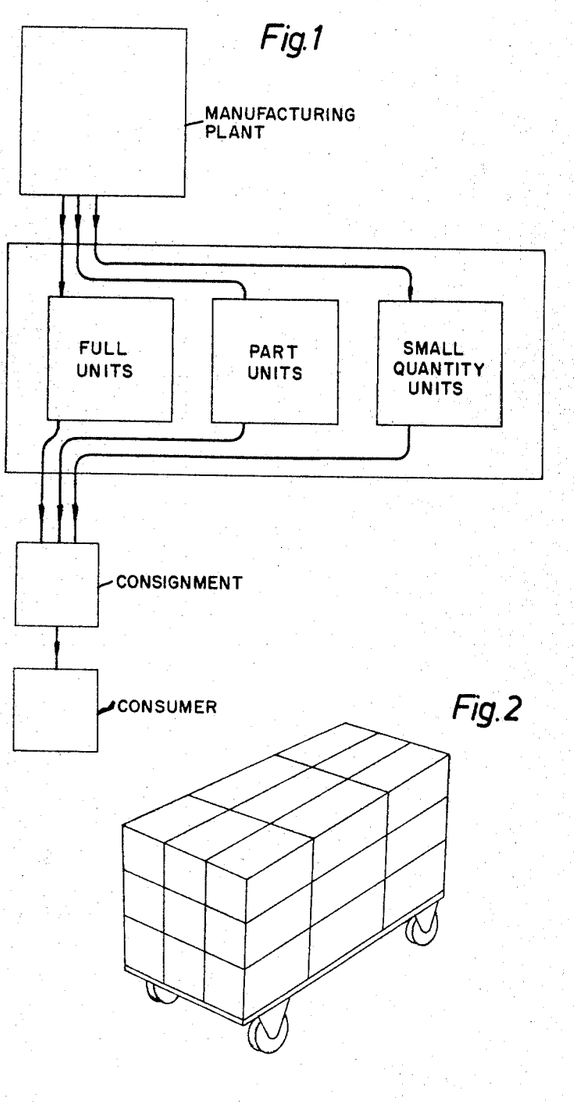
FIGURE 1 is a flow diagram from the plant to the consumer.
FIGURE 2 is a roller pallet used in the method described.

FIGURE 1 shows a flow diagram for a single type of article from the manufacturing plant to the consumer or depository, respectively. Stocking units, without any differences on the outside, are jointly transferred from the plant to the store or warehouse and here (still as complete stocking units) get into a full unit stocking section, a part unit stocking section (with complete stocking units as full units, which, however, are designed for removal in fractions), and a small quantity stocking section. In contrast to methods known to this date, thus one and the same type of article is subdivided stockingwise. By this at first a certain complication must be put up with as to the stocking process, which, however, is compensated by an essential simplification of removal efforts. The complication with regard to the stocking process is negligible because the stocking also with regard to part units and small quantities requires little efforts. But removal efforts are essentially lower than in known processes in which large and smallest quantities must be collected for consignment, and also large quantities can be precision-adjusted, as the major portion of the collecting process for consignments composes of large full units, as another large portion can be collected for consignments in the form of simple fractions of stocking units and can be easily made up into new stocking units, and because only a very small consignment portion (small quantities) must be collected with an expenditure in manual labour and storage space with which in known processes of comparable precise collection of consignments the entire quantity must be assembled.

Space requirements with the method according to the invention are small as for the most part flow racks can be used.

Full units, stocking units of part quantities and stocking units of small quantities are collected for a consignment (see FIGURE 1) at store's outlet and from there are transported to the consumer.

II. LAYOUT OF STORE

(1) *Racks*

Figure 3:
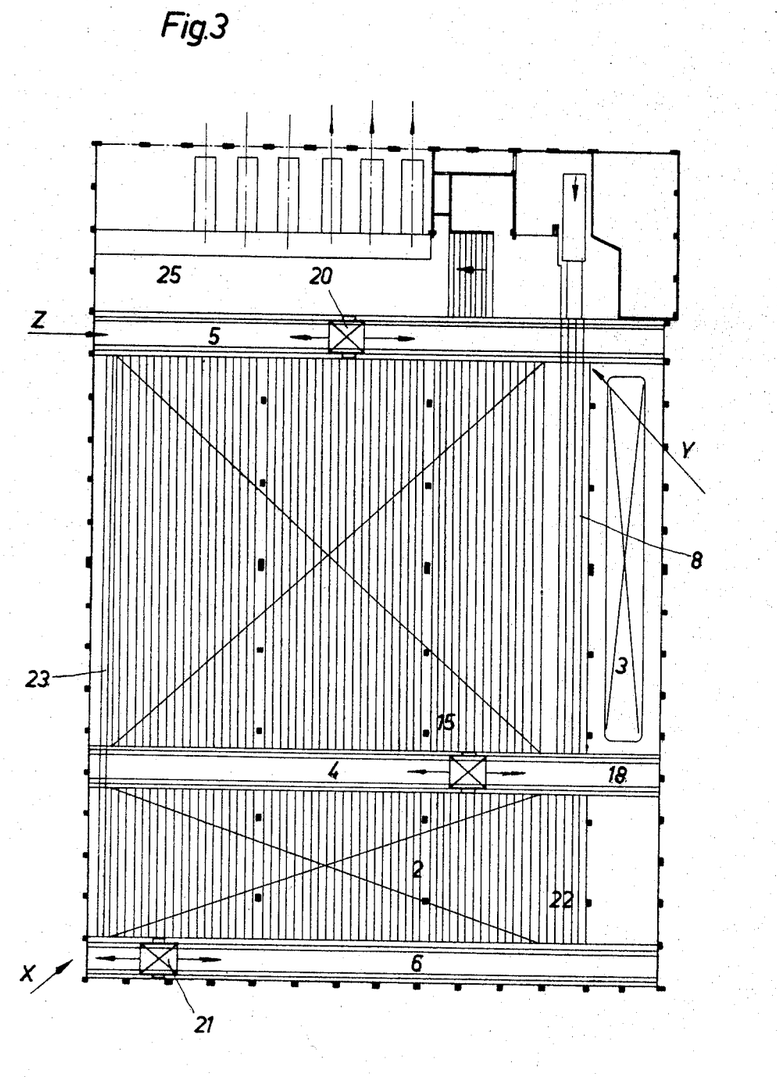
FIGURE 3 is a ground plan of the store.
Figure 9:
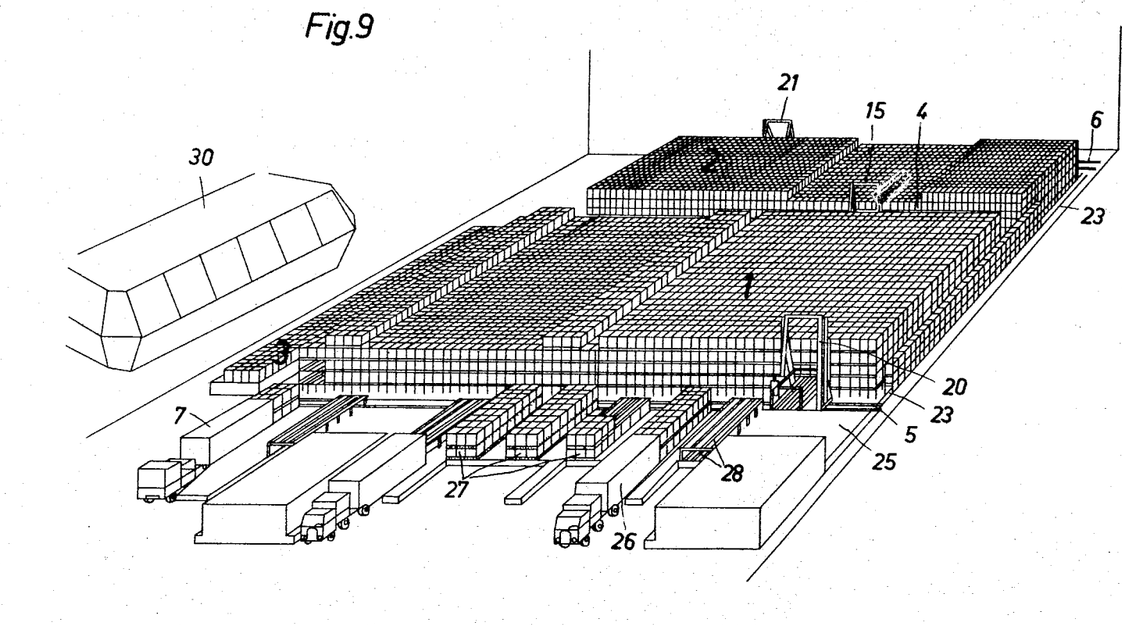
FIGURE 9 is a perspective view of the store.

In FIGURES 3 and 9 three rack sections can be seen. Section 1 serves the stocking of full units, section 2 serves the stocking of part units, and section 3 is the small quantity store. The racks for full units and part units are flow racks for pallets pursuant to FIGURE 2, each rack comprising storage cells in the form of a pair of rails on which these pallets run. Always four cells or pairs of rails are arranged above each other in the racks 1 and 2.

The racks of sections 1 and 2 have a flow direction and corresponding inclination from track 4 (from which introduction of full quantities and part units is effected) to the full quantity removal track 5 or part unit removal track 6. Pallets introduced into the racks from track 4 because of this inclination automatically roll to the removal end. In order to avoid that the rolling pallets have a too high speed devices can be provided which firstly in the case of too high speeds will have a braking effect and secondly in the case of too low speeds will have an accelerating effect.

One rack rail track is always designed for one and the same type of article only. A shifting to another type of article generally will be carried out only after a complete emptying of the track. Several racks can be designed for one type of article.

(2) *Introduction*

Figures 4, 5:
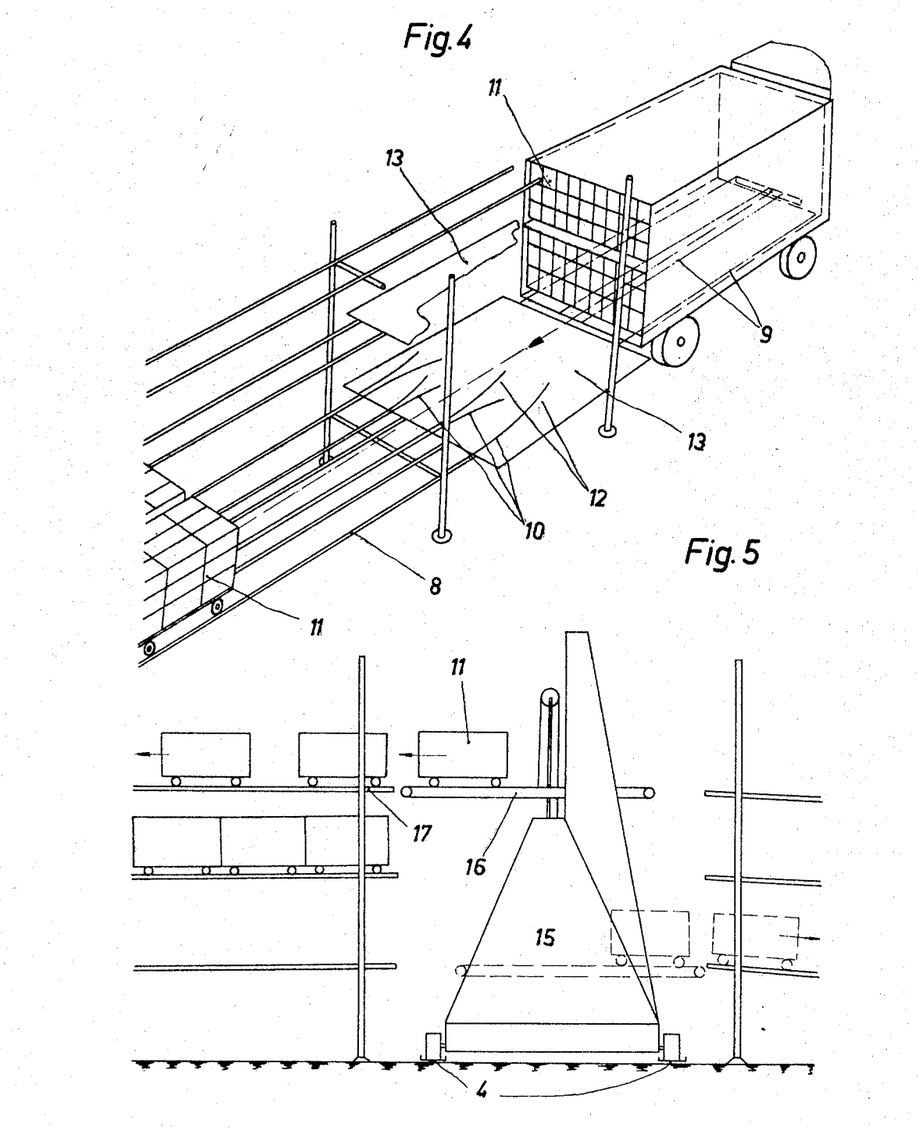
FIGURE 4 shows a vehicle connected to the inlet track for the transport from the plant to the store, viewed in the direction of the arrow *y* in FIG. 3.
FIGURE 5 is a view of the introducer traversing platform with racks located on both sides of it.

The goods are transported from the manufacturing plant to the store by means of special supply vehicles 7 (FIGURES 4 and 9). These vehicles are provided with rail tracks upon which the loaded roll pallets are firmly fixed during transport. As shown in the figure the vehicle is driven to the front end of a group of rail tracks 8 which hereinafter will be called inlet track. The mutual arrangement of rail tracks 9 in the vehicle and rail tracks 10 at the front end of inlet track 8 coincides so that pallets 11 without any difficulties can be pushed from the rails 9 of the vehicle to the rails 10 of the store's inlet or introductory track 8. If necessary, devices can be provided which make an accurate mutual adjustment of rail ends possible. But in practice these devices did not turn out as absolutely necessary. For the inlet rails funnel-shaped, narrowing inlet pieces 12 for correct guidance of pallets 11 on the inlet section 13 can be provided.

The inlet train 8 discharges at right angles into the inlet track 4 for the racks of the full unit stocking section and the part unit stocking section.

The inlet track or aisle-way 4 (FIGS. 3 and 5) preferably consists of a rail track for one introducer traversing platform or crane means 15 which is movable on this rail track. The traversing platform is provided with rails 16 for takeup of roll pallets 11 which as to their size and possibly also with regard to their mutual arrangement register with the rails of the inlet track 8 and of racks 17. It is recommended that the rails of the traversing platform can be lifted and lowered as well as adjusted towards the racks so that the pallets can be pushed to any of the store's rails or the inlet track.

The traversing platform 15 can discharge pallets 11 to both sides, i.e., either into the full unit racks or into the part unit racks. The pallets can be controlled by hand but for practical purposes this is done automatically (see below).

From inlet track 4 preferably leads a track 18 into the small quantity stocking section.

(3) *Removal*

Removal from full unit store section 1 is carried out along removal track or aisle-way 5, and that by means of a traversing platform or crane means 20 (FIGURE 7) which essentially is similar to traversing platform 15. It is provided with devices for takeover of pallets from the racks, in addition the introducer traversing platform 15 is equipped with devices for takeover of pallets.

Figure 6:
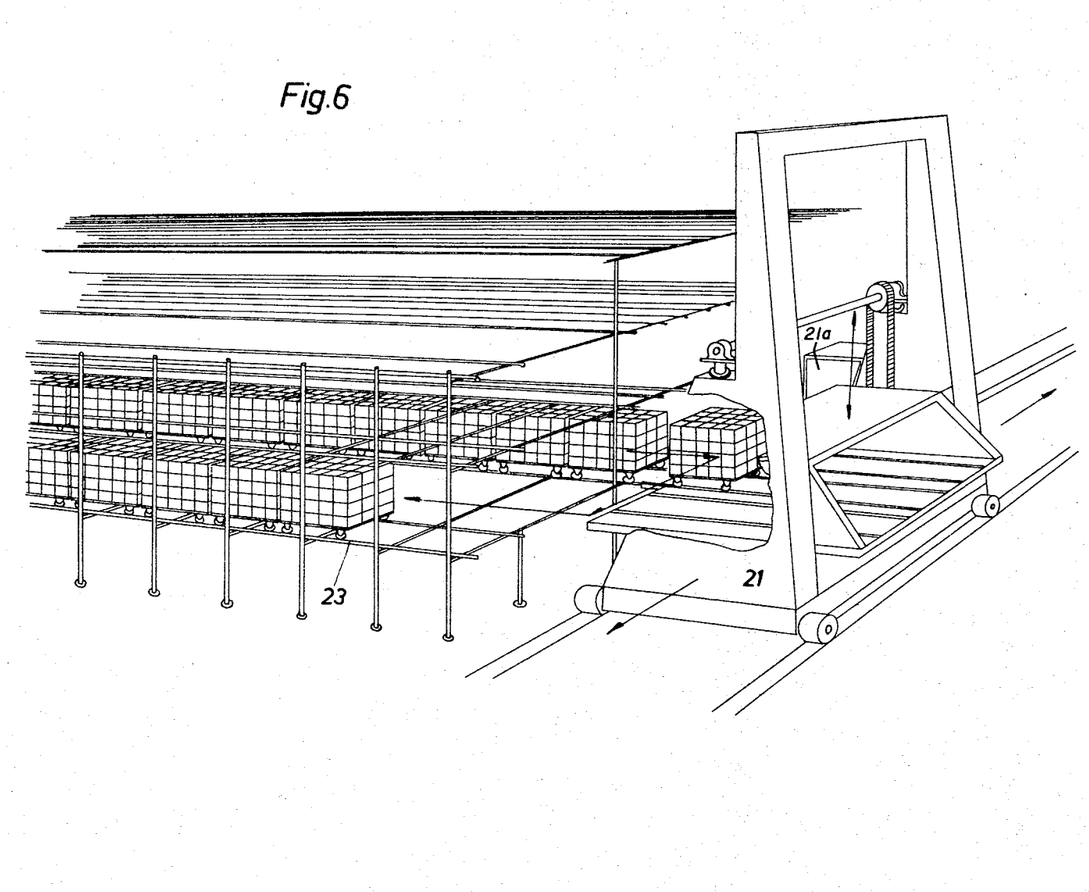
FIGURE 6 shows the removal traversing platform for part units, viewed in the direction of the arrow *x* in FIG. 3.

The removal from part unit stocking section 2 is carried out along removal track or aisle-way 6 by the traversing platform or crane means 21 (FIGURE 6) which basically is similar to traversing platforms 15 and 20. But whereas traversing platforms 15 and 20 handle whole units and therefore can operate fully automatically, the traversing platform 21, depending on instructions, must remove a certain fraction of a unit. This complicated removal, indeed, could also be carried out automatically, but is done more simply by hand. Therefore this traversing platform is provided with space for an operator, furthermore with an indicator device 21a by means of which the operator is always given the necessary information. The adjustment of traversing platform 21 to certain racks can also be effected automatically as with traversing platforms 15 and 20.

One or more assembly tracks 22 for stocking units of small quantities discharge also into removal track 6.

From part unit removal track 6 leads a connecting track or conveyor means 23 to remove track 5 and discharges herein the same way as the store racks of the full units. The part unit removal traversing platform 21 puts down on this track stocking units collected from the rack or removed from assembly track 22. The length of the connecting track 23 shall suffice for the maximum number of stocking units of part and small quantities in a consignment. The connecting track thus has the character of an assembly track for part and small quantities.

Figure 7:
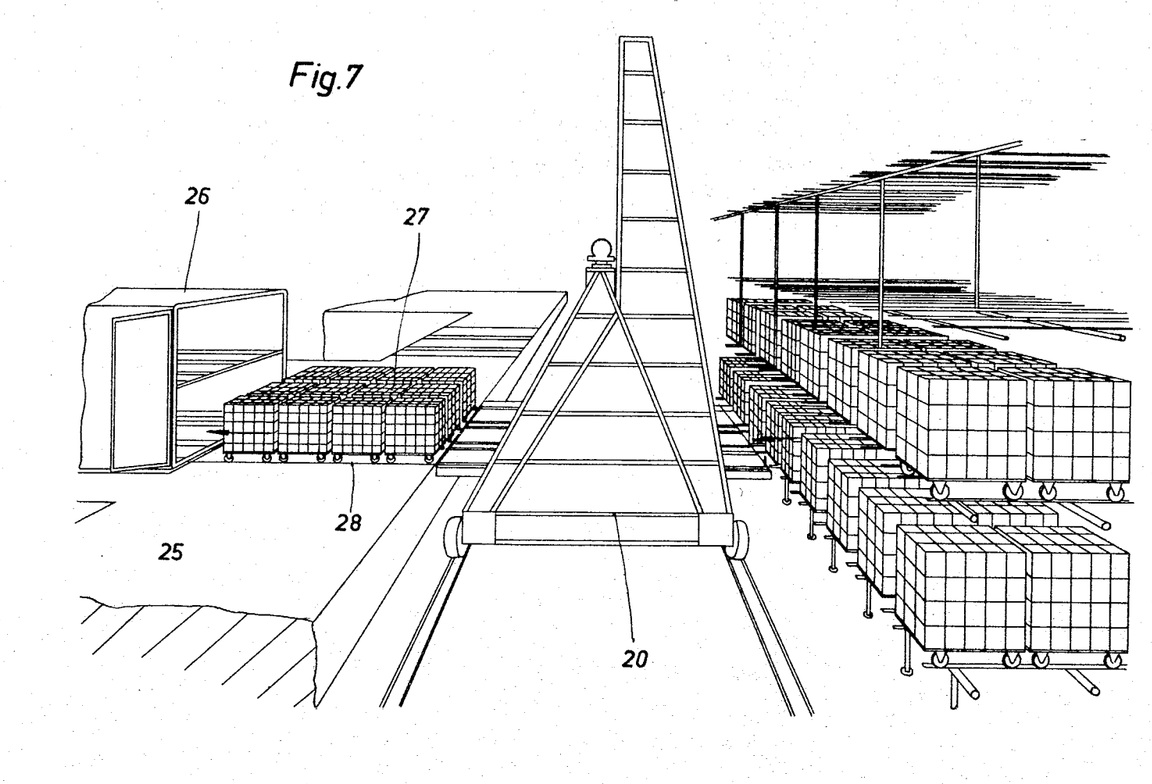
FIGURE 7 shows the removal traversing platform for full units with the loading ramp, viewed in the direction of the arrow *z* in FIG. 3.

On the removal track's 5 side turned away from the store, a loading ramp 25 is located on which pallets can be put down consignmentwise (FIGURE 7). Thus the full unit removal traversing platform 20 has not only the function to remove full units but must also take over the part unit and small quantity stocking units from the assembly track 23, and must discharge all goods at a prescribed loading spot on the ramp 25. Carrier vehicles such as trucks 26 stop on loading ramp's outside to take up consignments 27. Traditional vehicles are stacked with the packages on the pallets, or the pallets are driven upon the loading platform. It is more advantageous if special vehicles as the one shown in FIGURE 3 are also used for the transport or shipment from the store to the consumer or depository, respectively. In this case for practical purposes multi-tiered assembly or loading tracks 28 for consignments are provided in such a manner that the pallets on these tracks can be pushed directly on the equally arranged tracks in the truck. These assembly tracks shall then have a length which is at least sufficient to take up the maximum number of pallets in a consignment.

The loading ramp, irrespective of whether assembly tracks are provided or not, can be designed so spaciously that a greater number of consignments can be stored in order that there are no delays if a truck drops out for any reason, or to have a big enough buffer volume to bridge repair times or idle shifts in the store.

(4) Control of store

In a central control stand 30 a control system model 31 is erected in which the store position and changes therein are reflected analogously. For practical purposes the processes are made visible to ensure an easy survey to operators. For example, the individual racks can be symbolized by glass tubes and the pallets stocked in the racks by balls which fit into the tubes. To ensure a check on flow periods, balls of different colours can be used for certain days or weeks.

Figure 8:
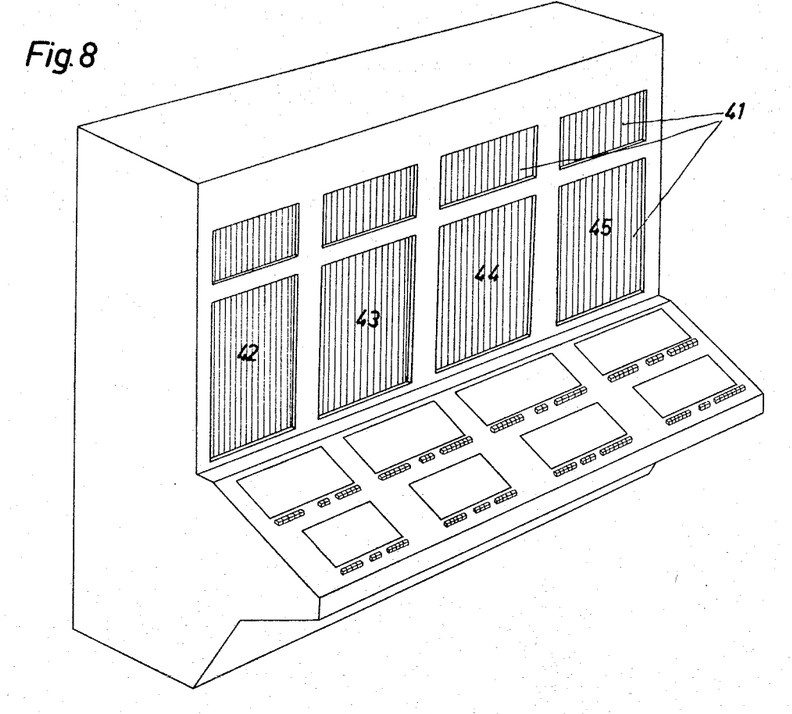
FIGURE 8 shows the control system model.

An example of such control system model is given in FIGURE 8. In it tubes 41 can be seen having each different fillings, these tubes being combined groupwise in panels 42, 43, 44, etc. Feeder traveling crabs and removal traveling crabs are running at top or bottom of tubes and correspond to the introducer or removal traversing platforms in the store.

In accordance with a special feature of the invention the control system model is direct controlled whereas the store as such is operated from the control system model on the basis of a follower control system.

As is known for automatic introduction suitable control code carriers belonging to the individual units to be stocked, for example, punched cards are used. Removal can be controlled in the same manner. Here it must be distinguished between small quantity removal, part quantity removal and full unit removal; the transfer of stocking units of small quantities to the part quantity removal traversing platform is handled like a part quantity removal; the transfer of stocking units of part quantities and small quantities from the assembly track 23 to the full unit removal traversing platform is controlled correspondingly. Punch cards are kept in reserve for these processes. Equally punched cards are provided for other special operations of the traversing platform, for example, for the transfer of part quantity stocking units of the assembly track 23, or for the transfer of stocking units at certain loading spots of the loading ramp.

The control unit is so designed that the individual punched cards can be inserted magazinewise. Thus, for example, to each vehicle coming from the manufacturing plant to the store belongs a pack of punched cards which are arranged in the magazine in accordance with the sequence of pallets in the vehicle, so that the stocking instructions related to the individual pallets actually are issued in the correct sequence.

For stocking the control arrangement is so designed that racks can be stocked cyclically if several racks are coordinated to one and the same type of article. In a corresponding cycle articles are removed from the racks so that it is always ensured that articles are removed from the racks in the same sequence as they were stocked.

III. METHOD OF OPERATION

The refilling of the store is effected in accordance with the actual stocks on hand which easily can be taken from the stock indicator. This ensures shortest possible stocking periods.

The lots going from the manufacturing plant to the store are accompanied by information about the type of article stacked on the individual pallets and their coordination in the full unit stocking section, part unit stocking section or small quantity stocking section. Such information can be attached to the lot in form of a number of punched cards. But the punched cards can also be produced in the store in accordance with corresponding electric instruction from a remote central office, and then be inserted in their correct sequence into the control arrangement. In addition to the aforementioned data the individual punched cards should also contain a store number and date. Several sequential pallets of the same type can be controlled with one single punched card on which then in addition must be noted the number of standard quantities.

The number of units per punched card must not exceed the number of pallets which can be carried by one introducer traversing platform 15.

These traversing platforms transport the pallets into the determined racks in the full unit stocking section or the part unit stocking section or to the feeder track 18 to the small quantity stocking section.

For the collecting of consignments from the store, punched cards are produced for the automatic removed of the articles belonging to each consignment, that means various punched card groups firstly for the removal of full units and of part and small quantity stocking units from the assembly track, secondly for the removal of part quantities and of assembled small quantity stocking units, and thirdly, if necessary, for the removal of small quantities.

The first group, in addition to punched cards with control instructions for the removal, also contains punched cards with transfer instructions to the loading ramp. The second group, in addition to punched cards with removal instructions, also contains punched cards with instructions for the transfer to the assembly track 23. The instructions for the removal of part quantities are subdivided in such a manner, that firstly an automatic adjustment of the traversing platform at a certain rack is effected, and secondly that the size of part quantities is indicated to operators on an illuminated indicator board. The removal of small quantities, if necessary, can be automated to such an extent, that store vehicles are provided with indicator boards which are fed with information on the removal, or that in another known manner the removal vehicles are automatically steered to certain racks. But small quantities can also be removed without any remote information, that is in the simple, conventional way, as costs caused by such mode of operation are low because of the small portion of small quantities involved.

When working out the removal programme, the sequence can be arranged arbitrarily in order that the traversing platforms must travel the shortest possible ways. With the full unit traversing platform also points as to loading techniques can be taken into consideration with the collecting of consignments in a certain order on assembly tracks, for example, it can be arranged that particularly heavy units are stocked at the bottom.

We claim:

1. A material handling system comprising at least two storage racks having horizontally and vertically spaced storage cells, each cell having an infeed and outfeed end, a first aisle-way located between said racks, a crane means movable in said aisle-way to deliver loads to the storage cells, a shipping area, a second aisle-way between said shipping area and the outfeed ends of one rack of storage cells, a third aisle-way at the outfeed ends of the other rack of storage cells, a second and third crane means, one of said second and third crane means being mounted in each of said latter-named aisle-ways for removing loads from the outfeed ends of the storage cells, a conveyor means extending across the ends of said second and third aisle-ways at one side of said racks whereby a load removed from the storage cells by the crane means in the third aisle-way may be deposited on said conveyor means for transfer to the crane means in the second aisle-way for delivery to the shipping area, and control means for said system including a direct controlled model of said system for controlling and displaying the operations and conditions of the system.

2. A system as claimed in claim 1, including wheeled load-supporting means, and rail means on said crane means for receiving said load-supporting means, each of said storage cells comprising a pair of rails adapted to accommodate said load-supporting means thereon, each of said pair of rails being inclined so as to cause flow of said load-supporting means with said loads thereon towards said outfeed end of the respective storage cell.

3. A system as claimed in claim 2, including an introductory track leading to said first aisle-way, supply vehicles for transporting said wheeled load-supporting means with said loads thereon to said introductory track, and rail means on said supply vehicles for accommodating said load-supporting means, the last-named rail means being connectible to said introductory track for transfer of said load-supporting means thereto.

4. A system as claimed in claim 3, including a third storage rack adjacent to said introductory track for receiving loads therefrom, and means connecting said third storage rack to said third aisle-way for movement of loads from said third storage rack to said shipping area.

5. A system as claimed in claim 2, including shiftable track means located in said shipping area and adapted to be moved to selected shipping regions, said shiftable track means being disposed at an angle to said second aisle-way for transfer of said wheeled load-supporting means thereto; carrier vehicles adapted to receive said load-supporting means from said shiftable track means for shipment; and rail means on said carrier vehicles for accommodating said load-supporting means, the last-named rail means being connectible to said shiftable track means.

6. A system as claimed in claim 2, wherein said wheeled load-supporting means comprises wheeled pallets.

7. A system as claimed in claim 1, including storage code carriers adapted to be inserted in said control means for causing deposit of said loads on said storage racks; and removal code carriers adapted to be inserted in said control means for causing removal of said loads from said storage racks.

8. A system as claimed in claim 7, including means actuated by said storage and removal code carriers for determining the position of said crane means.

9. A system as claimed in claim 7, including means mounted on at least said third crane means for indicating the quantity of loads to be taken from the storage cells associated therewith.

10. A system as claimed in claim 9, including a device for indicating said quantity of loads visually.

References Cited

UNITED STATES PATENTS

| | | |
|---|---|---|
| 1,927,677 | 9/1933 | Bennington. |
| 2,096,958 | 10/1937 | Clerc. |
| 2,988,237 | 6/1961 | Devol. |
| 3,033,392 | 5/1962 | Baumann et al. |
| 3,140,009 | 7/1964 | Wallace _____________ 214—16.4 |
| 3,206,041 | 9/1965 | McGrath _____________ 214—8.5 |
| 3,027,022 | 3/1962 | Percs _______________ 214—11 |
| 3,027,023 | 3/1962 | McGrath. |

GERALD M. FORLENZA, *Primary Examiner.*

RAYMOND B. JOHNSON, *Assistant Examiner.*

U.S. Cl. X.R.

214—38